US008379130B2

(12) United States Patent
Forutanpour et al.

(10) Patent No.: US 8,379,130 B2
(45) Date of Patent: Feb. 19, 2013

(54) APPARATUS AND METHOD OF PROCESSING IMAGES BASED ON AN ADJUSTED VALUE OF AN IMAGE PROCESSING PARAMETER

(75) Inventors: Babak Forutanpour, San Diego, CA (US); David L. Bednar, San Diego, CA (US); Ying X. Noyes, San Diego, CA (US); Szepo R. Hung, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 12/537,547

(22) Filed: Aug. 7, 2009

(65) Prior Publication Data

US 2011/0032373 A1 Feb. 10, 2011

(51) Int. Cl.
*H04N 5/228* (2006.01)
(52) U.S. Cl. .............................. 348/333.01; 348/333.05
(58) Field of Classification Search .............. 348/333.05
See application file for complete search history.

(56) References Cited

U.S. PATENT DOCUMENTS

| | | | |
|---|---|---|---|
| 5,227,835 A | 7/1993 | Anagnostopoulos | |
| 6,028,611 A | 2/2000 | Anderson et al. | |
| 6,237,010 B1 * | 5/2001 | Hui et al. | 715/205 |
| 6,301,440 B1 * | 10/2001 | Bolle et al. | 396/128 |
| 6,577,751 B2 | 6/2003 | Yamamoto | |
| 6,614,456 B1 | 9/2003 | Rzepkowski et al. | |
| 6,628,823 B1 | 9/2003 | Holm | |
| 6,813,389 B1 | 11/2004 | Gindele et al. | |
| 7,019,778 B1 | 3/2006 | Prabhu et al. | |
| 7,586,524 B2 * | 9/2009 | Tsue et al. | 348/231.2 |
| 7,714,898 B2 * | 5/2010 | Pilu | 348/222.1 |
| 2003/0053095 A1 * | 3/2003 | Nakami | 358/1.9 |
| 2003/0067551 A1 * | 4/2003 | Venturino et al. | 348/364 |
| 2003/0151674 A1 * | 8/2003 | Lin | 348/222.1 |
| 2005/0007468 A1 * | 1/2005 | Stavely et al. | 348/239 |

(Continued)

FOREIGN PATENT DOCUMENTS

| | | |
|---|---|---|
| EP | 1691371 | 8/2006 |
| EP | 1693797 | 8/2006 |

(Continued)

OTHER PUBLICATIONS

ACD Systems International Inc.: "acdseepro 2.5, the complete toolbox for photographers, User Guide", Apr. 19, 2009, XP002635439, Retrieved from the Internet: URL: http://replay.web.archive.org/20090419063008/http://files.acdsystems.com/english/acdseepro/manuals/acdseepro25-usergui de.pdf [retrieved on Apr. 29, 2011].

(Continued)

*Primary Examiner* — Jason Chan
*Assistant Examiner* — Abdelaaziz Tissire
(74) *Attorney, Agent, or Firm* — James R. Gambale, Jr.

(57) ABSTRACT

An apparatus and method of processing images is disclosed. In a particular embodiment, the method includes receiving a selection of a first image from a plurality of images stored at a memory device and displaying the first image. The method also includes receiving image modification data to modify processing of the first image displayed and providing an adjusted value of an image processing parameter to an image processor. The adjusted value of the image processing parameter is determined based at least in part on the image modification data.

33 Claims, 12 Drawing Sheets

U.S. PATENT DOCUMENTS

| | | | |
|---|---|---|---|
| 2005/0128316 A1 | 6/2005 | Sugimori | |
| 2005/0243351 A1 | 11/2005 | Aoyama | |
| 2006/0170707 A1* | 8/2006 | Kokemohr | 345/629 |
| 2007/0183656 A1* | 8/2007 | Kuwahara et al. | 382/162 |
| 2007/0195343 A1* | 8/2007 | Yoneda | 358/1.9 |
| 2008/0002030 A1* | 1/2008 | Sakurai et al. | 348/207.99 |
| 2008/0050111 A1* | 2/2008 | Lee et al. | 396/429 |
| 2008/0055616 A1* | 3/2008 | Scott et al. | 358/1.9 |
| 2009/0174786 A1* | 7/2009 | Joseph | 348/222.1 |
| 2009/0322899 A1* | 12/2009 | Chan et al. | 348/222.1 |

FOREIGN PATENT DOCUMENTS

| | | |
|---|---|---|
| WO | WO2006109302 | 10/2006 |

OTHER PUBLICATIONS

Anonymous: "Adding security to PDF files", Adobe Photoshop CS4, Feb. 11, 2009, p. 1, XP002635441, Retrieved from the Internet: URL: http://replay.web.archive.org/20090211092514/http://heip.adobe.com/en US/Photoshop/11.0/WSD8510F96-61B5-4c27-8F88-291514A5 C7DF.html [retrieved on May 5, 2011].

Anonymous: "Adobe Photoshop 7.0 User Guide for Windows and Macintosh" Adobe Photoshop 7.0.User Guide for Windows and Macintosh, Jan. 1, 2002, pp. 86-156, XP002321591.

Anonymous: "Canon Digital IXUS 800IS—Advanced Camera User Guide"COnline1 Nov. 20, 2007, XP002601683 Canon Europe Retrieved from the Internet : URL: http://files . canon-europe. com/f i les/soft28081/manual /IXUS-800 1SSADVCUG-EN. pdf>.

Anonymous: "Getting Started with Picasa: Getting Started Guide", Picasa and Picasa Web Albums, Dec. 17, 2008, pp. 1-17, XP002635442, Retrieved from the Internet: URL: http://replay.web.archi ve.org/20081217085619/http://pi casa.google.com/support/bi n/answer.py?answer=93183&topi c=16026 [retrieved on May 4, 2011].

Anonymous: "Syncing Your Changes to Picasa Web Albums: 'Sync to Web' basics", Picasa and Picasa Web Albums, Feb. 2, 2009, pp. 1-3, XP002635443, Retrieved from the Internet: URL: http://replay.web.archi ve.org/20090202210909/http://picasa.google.com/support/bi n/answer.py?answer=106176 [retrieved on May 4, 2011].

"GNU Image Manipulation Program", GIMP Documentation Team, Jan. 17, 2009, XP002635440, Retrieved from the Internet: URL: http://replay.web.archive.org/20090117111523/http://docs.gi mp.org/en.pdf [retrieved on May 4, 2011].

International Search Report and Written Opinion—PCT/US2010/044769—ISA/EPO-Jun. 10, 2011.

Partial International Search Report—PCT/US2010/044769—International Search Authority, European Patent Office, Oct. 25, 2010.

\* cited by examiner

APPARATUS AND METHOD OF PROCESSING IMAGES BASED ON AN ADJUSTED VALUE OF AN IMAGE PROCESSING PARAMETER

FIELD

The present disclosure is generally related to processing images.

DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera and a digital video camera. Also, such wireless telephones can process executable instructions, including software applications, such as a web browser application, that can be used to access the Internet. As such, these wireless telephones can include significant computing capabilities.

A user of a portable photographic device (e.g., a wireless phone with a camera) may have preferences with regard to one or more display variables. For instance, the user may have a tolerance limit of blurriness, darkness, contrast, etc. It would be advantageous to incorporate the user's preferences into image display by the device.

SUMMARY

A photo viewing application enables viewing and editing of an image that has been captured and stored at a portable electronic device. The photo viewing application has hooks to an image processing pipeline of the portable electronic device so that the image processing pipeline can be tuned based on user input received via the photo viewer application. For example, the photo viewing application may provide a series of interactive screens to the user to determine one or more characteristics of the image, such as a memory color saturation or an overall image sharpness or blurriness that a user may adjust. Adjusted values of image processing parameters may be stored and used by the image processing pipeline during processing of subsequent images that are captured at the portable electronic device.

In a particular embodiment, a method of processing image data is disclosed. The method includes receiving a selection of a first image from a plurality of images stored at a memory device and displaying the first image. The method also includes receiving image modification data to modify processing of the first image displayed and providing to an image processor an adjusted value of an image processing parameter. The adjusted value of the image processing parameter is determined based at least in part on the image modification data.

In another particular embodiment, an apparatus is disclosed and includes a processor and a memory accessible to the processor. The memory includes a photo album module executable by the processor to receive a selection via a graphical user interface (GUI) of a first image selected from a plurality of images stored at the memory and to retrieve the selection from the memory. The apparatus also includes an interface module executable by the processor to display the first image at a display device and an image processing module executable by the processor to receive image modification data to modify processing of the first image and to provide to the processor an adjusted value of an image processing parameter. The adjusted value of the image processing parameter is based at least in part on the image modification data.

In another particular embodiment, a computer readable medium storing computer executable code is disclosed and includes code for receiving a selection via a graphical user interface (GUI) of a first image from a plurality of images stored at a memory device. The computer readable medium also stores code for displaying the first image, code for receiving image modification data to modify the first image, and code for providing an adjusted value of an image processing parameter to an image processor. The adjusted value of the image processing parameter is determined based at least in part on the image modification data.

In another particular embodiment, an apparatus is disclosed and includes means for receiving a selection via a graphical user interface (GUI) of a first image selected from a plurality of images stored at a memory device and display means for displaying the first image at a display device. The apparatus also includes update means for receiving first image modification data to modify processing of the first image prior to displaying a first modified image that is based on the first image and for providing a first adjusted value of a first image processing parameter to an image processor. The first adjusted value of the first image processing parameter is based at least in part on the first image modification data.

One particular advantage provided by at least one of the disclosed embodiments is that an image processing pipeline can be tuned by a user. Subjective image processing parameters, such as face blurriness and memory color enhancement, may be adjusted to satisfy a user's personal preference and applied to subsequent image capture operations. An image capture and viewing experience of the user may therefore be enhanced.

Other aspects, advantages, and features of the present disclosure will become apparent after review of the entire application, including the following sections: Brief Description of the Drawings, Detailed Description, and the Claims.

DETAILED DESCRIPTION

Figure 1:
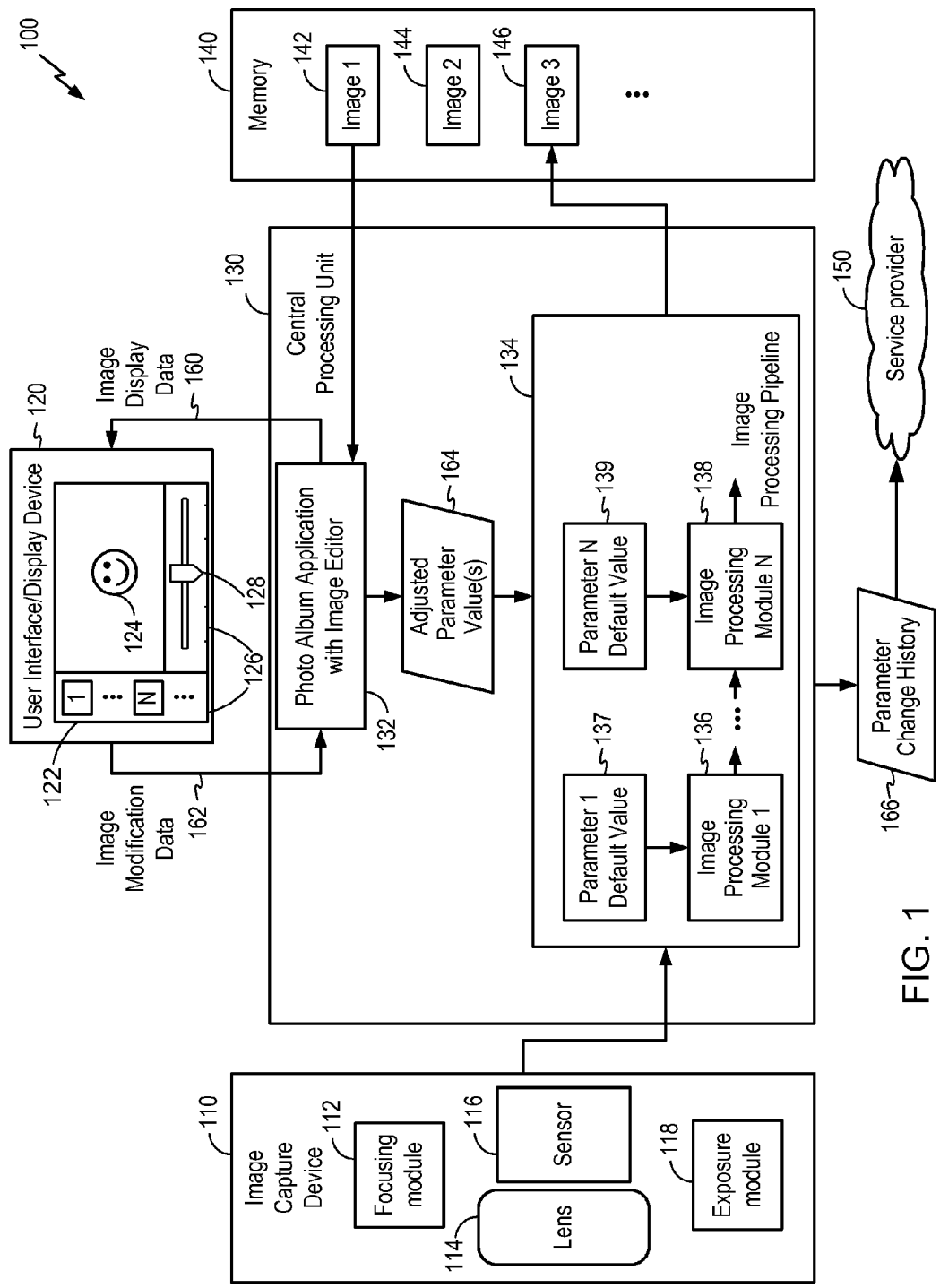
FIG. 1 is a block diagram of a particular illustrative embodiment of a system to capture and display images.

Referring to FIG. 1, a particular embodiment of a system to capture, process, and display images and is depicted and generally designated 100. The system 100 includes an image capture device 110 and a user interface 120 coupled to a central processing unit 130. The central processing unit 130 is coupled to a memory 140 and may be configured to communicate with a service provider 150. The central processing unit 130 includes a photo album application 132 that includes an image editor. The photo album application 132 may be pre-installed or may be acquired from a third party source that may be accessed via e.g., wireless access, wired access such as by Universal Serial Bus (USB) connection, or via another means of access. The central processing unit 130 also includes an image processing pipeline 134 that can be tuned in response to user interaction with a stored image via the photo album application 132.

In a particular embodiment, the image capture device 110 includes a focusing module 112, a lens 114, a sensor 116, and an exposure module 118. The focusing module 112 and the exposure module 118 may be operative to adjust a focus condition of the lens 114 and an exposure for an image capture operation at the sensor 116. The sensor 116 is configured to detect incoming light and to provide image data to the image processing pipeline 134.

The user interface 120 includes a display device and an input device (not shown), such as a touchscreen or one or more physical navigation and selection devices, as illustrative examples. The user interface 120 is configured to receive image display data 160 and to display a corresponding image 124. The user interface 120 may also be configured to enable user interaction via the input device with one or more graphical user interface (GUI) elements 126, such as a menu 122 of selectable image processing parameters and an adjustable control 128, illustrated as a slider control, to adjust a value of a selected parameter.

The central processing unit 130 implements the photo album application 132 and the image processing pipeline 134. The photo album application 132 may interact with an application programming interface (API) that enables interaction with the image processing pipeline 134. The central processing unit 130 may include one or more processing devices (not shown), such as one or more general purpose processors, digital signal processors, image processors, or any combination thereof. The central processing unit 130 may also be configured to control communication of the image display data 160 to the user interface 120 and to receive image data, such as image modification data 162, from the user interface 120 in response to user input. The central processing unit 130 may also be configured to control file storage and retrieval operations at the memory 140.

The image processing pipeline 134 is configured to receive captured image data from the image capture device 110 and to provide processed image data for storage at the memory 140, illustrated as a first data file corresponding to a first image 142, a second data file corresponding to a second image 144, and a third data file corresponding to a third image 146. The image processing pipeline 134 includes multiple image processing modules, such as a representative first image processing module 136 and Nth image processing module 138. In a particular embodiment, each image processing module may be implemented as dedicated circuitry configured to perform one or more processing operations on incoming image data and to provide output image data to a next processing module. In other embodiments, one or more modules may be implemented by a processor executing instructions to perform the corresponding processing operation. The image processing modules may apply general image adjustments such as a black level subtraction, a lens correction, or one or more channel gains, while other image processing modules may apply region-of-interest specific adjustments, such as a memory color enhancement or face blurriness detection.

One or more of the image processing modules 136, 138 may read a value of a corresponding image processing parameter, which may be stored in dedicated memory cells, registers, on-chip random access memory (RAM), the memory 140, or any combination thereof. As illustrated, the first image processing module 136 is responsive to a default value of a first image processing parameter 137 and the Nth image processing module 138 is responsive to a default value of an Nth image processing parameter 139. For example, a channel gain module may read multiple gain values corresponding to multiple color channels of the image data, while a memory color enhancement module may read one or more saturation gain values to be applied to detected memory color regions of the image data.

During operation, the image capture device 110 may perform an image capture operation of a first image to generate image data that is sent to the image processing pipeline 134. The image processing pipeline 134 may process the received image data using the image modules 136, 138 and the default values of the image processing parameters 137, 139. The processed image data may be stored in the memory 140 as the first data file for the first image 142. A second image capture operation of a second image may be performed in a similar manner to generate the second data file for the second image 144.

The photo album application 132 may be launched in response to user input via the user interface 120. The photo album application 132 may provide to the user interface 120 a list or menu of a plurality of images that are stored at the memory 140. A user selection of the first image may be received from the user interface 120 and provided to the photo album application 132. In response, image data from the first data file for the first image 142 may be read and provided for display at the user interface 120.

Upon viewing the displayed image, a user may determine that one or more adjustments would be preferable. For example, the user may decide that a sky region of the image should be more vibrant or have a richer blue color. The user may select an option to launch the image editor of the photo album application 132 and select an option to adjust the blue sky saturation parameter, such as by selecting a corresponding option of the menu 122. In response, the adjustable control 128 may be displayed to enable the user to make adjustments to the displayed image. In a particular illustrative embodiment, a predetermined order of parameter adjustments is imposed within the menu 122, allowing the user to make adjustments to several parameters if executed according to the predetermined order. In a particular illustrative example, the user can adjust a parameter labeled parameter 1 after which the user can adjust another parameter labeled parameter 3. However, the user is prevented from adjusting the parameter 3 before adjusting the parameter 1.

The predetermined order of parameter adjustments may be based on an order of imaging processing in the image processing pipeline 134. For example, in an imaging pipeline in which sharpening occurs prior to skin tone correction, the user may be permitted to adjust the sharpening parameter prior to adjusting the skin tone parameter, but the user may be prevented from adjusting the skin tone prior to adjusting the sharpness.

A user may be permitted to make adjustments to a plurality of image parameters, and the user interface/display device 120 displays the adjusted image processed according to a predetermined order associated with the imaging pipeline. For example, in a system in which the imaging pipeline processes sharpness prior to processing skin tone, when a user enters a skin tone adjustment prior to entering a sharpness adjustment, the user interface/display device 120 will display a modified image in which the sharpness adjustment has been applied prior to the skin tone adjustment.

As the user interacts with the adjustable control 128, image modification data 162 is received indicating modification of the image to be displayed, and the photo album application 132 causes the displayed image to be adjusted accordingly. For example, the photo album 132 may emulate processing of a memory color enhancement module (not shown) of the image processing pipeline 134. As another example, the actual memory color enhancement module (not shown) may be launched to operate on the image display data 160.

When the user is satisfied with the changes to the image, one or more adjusted image processing parameter value(s) 164 may replace the corresponding default values used by the image processing pipeline 134. As a result, when a subsequent image capture operation is performed, the adjusted parameter value(s) 164 will be used. To illustrate, after the user has adjusted the sky region of the first image, a blue sky saturation gain parameter may be adjusted to have a larger default value. Subsequently, when a third image capture operation of a third image is performed, and the image processing pipeline 134 identifies the third image as having a blue sky region, the larger default gain value will be applied and the resulting image data will saved at the memory as the third image data file for the third image 146.

In this manner, a user may tune the image processing pipeline 134 to the user's particular preference. To increase a likelihood that the user will converge to a preferred set of parameter values that are satisfactory to the user, one or more tests or confirmations may be performed prior to committing image processing parameter changes, such as will be discussed with respect to FIGS. 6 and 10. The history of user changes to the image processing parameters may be maintained and provided as a parameter change history 166 to the service provider 150, such as via a wireless or wireline network. The service provider 150 may aggregate change history data from multiple devices for use in future designs, updates, or statistical analyses. In addition, the history of changes applied to the system 100 may be stored at the system 100 and used in case the user decides to undo one or more changes or to restore the original default parameters that were provided with the system 100.

Although the photo album application 132 is described as enabling tuning of the image processing pipeline 134 based on user feedback to stored images, in other embodiments one or more modules or operations of the image processing pipeline 134 may be adjusted in a similar manner during an image preview operation prior to a captured image being stored at the memory 140. In a particular embodiment, the adjusted parameter value(s) 164 may be applied to modify one or more images stored at the memory 140 in place of, or in addition to, being used to update the image processing pipeline 134.

Figure 2:
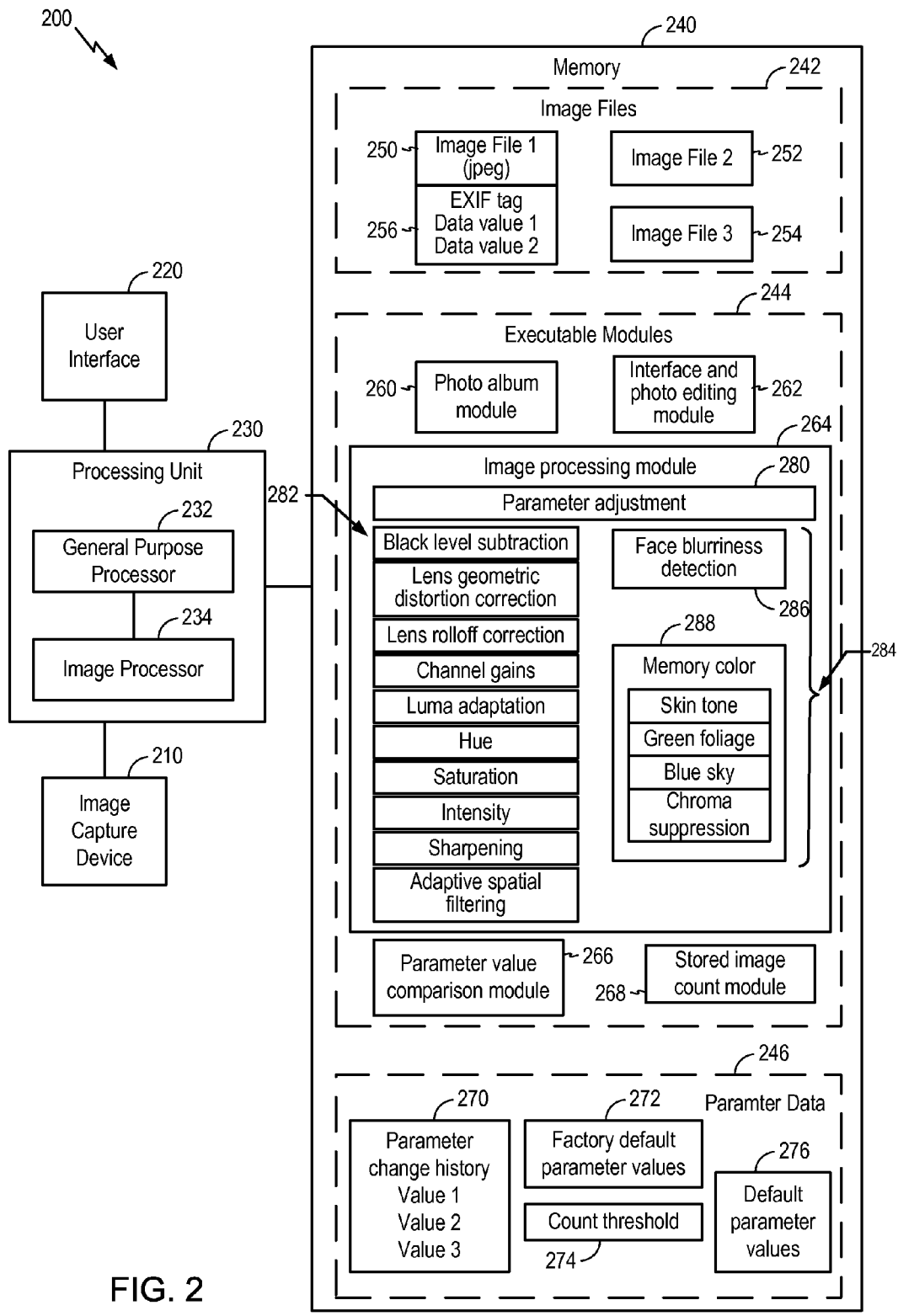
FIG. 2 is a block diagram of a particular embodiment of a system to capture and display images.

Referring to FIG. 2, a particular embodiment of a system to capture, process, and display images and is depicted and generally designated 200. The system 200 includes an image capture device 210 and a user interface 220 coupled to a processing unit 230. The processing unit 230 is coupled to a memory 240. The memory 240 includes a photo album module 260 and an interface and image editing module 262 that enable tuning of an image processing pipeline that is implemented via an image processing module 264. The system 200 can be implemented into a single apparatus such as a camera or phone. In a particular embodiment, the image capture device 210, the user interface 220, the processing unit 230, and the memory 240 correspond to the image capture device 110, the user interface 120, the central processing unit 130, and the memory 140 of FIG. 1, respectively.

In a particular embodiment, the processing unit 230 includes one or more hardware processors, such as a general purpose processor 232 and an image processor 234. The general purpose processor 232 and the image processor 234 may be configured to execute sets of program instructions such as modules that are stored at and retrieved from the memory 240. For example, the general purpose processor 232 may execute the photo album module 260 and the image processor 234 may execute the image processing module 264.

The memory 240 is a tangible storage device that stores a plurality of image files 242, executable modules 244, and parameter data 246. The image files 242 can include a first representative image file 250, a second representative image file 252, and a third representative image file 254. One or more of the plurality of image files 242 may correspond to images that were captured by the image capture device 210 and processed at the processing unit 230 prior to storage at the memory 240.

In a particular embodiment, images captured by the image capture device 210 are stored as Joint Photographic Experts Group Opeg) format files and are associated with a corresponding exchangeable image file format (EXIF) tag, such as the representative EXIF tag 256 associated with the first image file 250. The EXIF tag 256 can include data values representative of various conditions under which a first image was captured or processed. For example, the EXIF tag 256 can include data indicating whether the first image was taken by the image capture device 210, a white balance, exposure index, and other conventional or custom parameters associated with the first image. The EXIF tag 256 enables images taken under similar conditions or having similar characteristics to be easily located at the memory 240.

The executable modules 244 include the photo album module 260, the interface and photo editing module 262, the image processing module 264, a parameter value comparison module 266, and a stored image count module 268. When executed at the processing unit 230, one or more of the executable modules 244 may access a portion of the parameter data 246, such as a parameter change history 270, one or more factory default parameter values 272, a count threshold 274, one or more default image processing parameter values 276, or any combination thereof.

The photo album module 260 may be executable by the processing unit 230 to enable a user to select an image from the plurality of image files 242 via the user interface 220. The photo album module 260 may be executable to receive a selection of an image, such as the first image corresponding to the first image file 250, to retrieve the selection from the memory 240, and to provide image data to the interface and photo editing module 262 for display.

The interface and photo editing module 262 may be executable by the processing unit 230 to display an image at a display device of the user interface 220 based on received image data, such as image data that is provided by the photo album module 260. The interface and photo editing module 262 may also be executable to provide one or more graphical controls at the user interface 220 to enable a user to conduct image editing operations of a displayed image.

The interface and photo editing module 262 may be responsive to a selection from the user interface 220 to adjust one or more image processing parameter values based on user modifications to the displayed image in a manner similar to the operation of the photo album application with image editor 132 of FIG. 1. For example, the interface and photo editing module 262 may receive a selection of an image processing parameter that the user wishes to modify. In response, the interface and photo editing module 262 may display an adjustable control, such as the adjustable control 128 of FIG. 1. Manipulation of the adjustable control may be received by the interface and photo editing module 262 as image modification data and in response the interface and photo editing module 262 may provide an adjusted parameter value to the processing unit 230 to be applied to the displayed image. The image processing module 264 may be executed to generate modified image data in accordance with the adjusted parameter value. The interface and photo editing module 262 may display the modified image data at the display device so that the user can observe an effect of manipulating the control on the displayed image.

The image processing module 264 may be executable to apply various image processing operations to received image data. The image processing module 264 may include various sub-modules, such as a parameter adjustment module 280, general image processing modules 282, and region of interest processing modules 284. The general image processing modules 282 may be executable to perform one or more operations such as black level subtraction, lens geometric distortion correction, lens rolloff correction, channel gains, luma adaptation, hue, saturation, intensity, sharpening, and adaptive spatial filtering. One or more of the general image processing modules 282 may operate based on corresponding values of the default parameter values 276.

The region of interest modules 282 may be executable to perform operations at particular regions of interest within an image. For example, a face blurriness detection module 286 may be executable to detect one or more face regions within an image and to perform an edge detection operation and to alert a user when the face region is determined to be undesirably blurry. To illustrate, the face blurriness detection module 286 may compare a ratio of a number of soft edges within the face to a number of hard edges within the face and to compare the ratio to a threshold value from the default parameter values 276. A memory color module 288 may be executable to locate one or more regions within the image that correspond to skin, foliage, sky, or white regions. The memory color module 288 may perform a skin tone enhancement operation to apply a gain to skin tone saturation in the detected skin regions, a blue sky enhancement operation to apply a gain to a blue saturation in the detected sky regions, a green foliage enhancement operation to apply a gain to green saturation in the detected foliage regions, a chroma suppression operation to reduce a chroma component in the detected white regions, or any combination thereof One or more of the face blurriness threshold value, the memory color saturation gain values, or values used by the chroma suppression operation may be stored with the default parameter values 276.

The image processing module 264 may be executable to apply one or more of the general image processing modules 282 and the region of interest processing modules 284 to image data received from the image capture device 210 to function as an image processing pipeline, such as the image processing pipeline 134 of FIG. 1. Alternatively, or in addition, one or more of the modules 282 and 284 may be selectively executed, such as in response to user input to adjust the default parameter values 276 via the interface and image editing module 262.

The parameter adjustment module 280 may be executable to apply one or more tests or conditions prior to committing a requested change to the default parameter values 276. For example, the parameter adjustment module 280 may provide an adjusted parameter value to the parameter value comparison module 266 to determine whether a history of changes to the parameter value is converging. As another example, the parameter adjustment module 280 may prevent a change to the default parameter value when the stored image count module 268 indicates that an insufficient number of comparison images are stored to adequately demonstrate to a user the effect of applying the change to previously saved images.

The parameter value comparison module 266 may be executable to compare an adjusted parameter value to a history of changes to the parameter value. The parameter value comparison module 266 may locate first, second, and third adjusted values of the parameter in the parameter change history 270. The parameter value comparison module 266 can determine if the variance among the values of the image processing parameter associated with the viewed images is within an acceptable value. When the variance exceeds the acceptable value, the image processing parameter value comparison module 266 may generate a result indicating that the change history of the parameter suggests that the user is not converging to a preferred value of the image processing parameter. In response, the user may be prompted to restore the image processing parameter to a factory default value or to a prior adjusted value. For example the parameter value comparison module 266 may compare a first adjusted value of a first image processing parameter with a second adjusted value of the first image processing parameter, compare the first adjusted value of the first image processing parameter with a third adjusted value of the first image processing parameter, and provide a warning in response to determining that the first adjusted value is substantially equal to the second adjusted value, or that the first adjusted value is substantially equal to the third adjusted value.

The stored image count module 268 may be executable to locate images within the plurality of image files 242 that were taken by the image capture device 210 and that would be affected by an adjusted parameter value. For example, when the adjusted parameter is the threshold value for the face blurriness detection operation 286, the stored image count module 268 may locate stored images that were not previously flagged as blurry but would be flagged as blurry if the adjusted parameter value were applied. As another example, when the adjusted value is a memory color saturation value, such as skin tone saturation, the stored image count module 268 may locate stored images taken with the same white balance and exposure as a current image (such as a displayed image), as well as any other applicable parameters used to determine how to find and modify the particular memory color. As another example, the stored image count module 268 may locate stored images substantially matching the current image's luma level and overall high-frequency component when an adaptive spatial filtering parameter value is being adjusted.

The stored image count module 268 may compare the number of stored images with similar characteristics that have been located to the count threshold 274, which may have different values for the different processing parameters. When the number of located images do not meet the count threshold 274 for the adjusted parameter, a message may be generated indicating that an insufficient number of comparison images were located to demonstrate the effects of the change to the user.

During operation, the system 200 may apply the various executable modules 244 to enable a user to tune various image processing operations while verifying that changes are responsibly applied and reversible or returnable to factory default settings. For example, a user may elect to view stored images via a selection at the user interface 220. The user may select a particular image to view via the photo album module 260, which may call the interface and photo imaging module 262. The user may decide that the displayed image is not satisfactory, and may select an option via the user interface 220 that causes the interface and photo imaging module 262 to walk the user through a number of options to determine which aspects of the image can be improved.

The interface and photo imaging module 262 may present a series of options to guide the user through various regions of interest. For example, the image processing module 264 may launch the face blurriness detection module 286 to locate one or more face regions in the image. For every face located in the image, the face may be displayed to the user and the user may be queried as to whether the face was too blurry and should have been flagged at the time of image capture, so that user could have retaken the picture. The images of the faces can be scaled based on a horizontal resolution of the display at the user interface 220 relative to a common display resolution, such as 1280 pixels for a conventional personal computer display. For example, when the system 200 is a portable device such as a phone with a 320 pixel horizontal resolution, each face may be scaled by a factor of four to emulate a sharpness of resolution that the user will experience after downloading the picture to a home computer.

If the user indicates that the a face is too blurry, the stored image count module 268 may be launched to determine whether a sufficient number of pictures stored at the memory 240 would be affected if the face blurriness threshold were to be reduced to a next incremental value. If so, the user may be presented with a sample, or all, of the faces of each of the located images, scaled according to the display resolution, and the user may be informed that each of the presented faces would have triggered a face blurriness warning at the new threshold value. The user may then indicate whether to implement the change or maintain the default value via a selection at the user interface 220.

Next, the image processing module 264 may launch the memory color module 288 to locate one or more skin tone regions in the image. The interface and photo editing module 264 may provide an adjustable control to change a saturation in the skin tone regions. If the user selects an adjusted value of the skin tone saturation, the stored image count module 268 may be launched to determine whether a sufficient number of pictures stored at the memory 240 have skin regions for the same white balance and exposure as the current image, as well as for any other parameters used to determine how to find and modify skin tone regions, and avoiding pictures at low light level or D65 for pictures taken under tungsten lighting. If a sufficient number of pictures are located, the user may be presented with a series of the located images showing an effect of the change to those images. For each located image, the original image may be displayed side-by-side with an adjusted image using modified image data generated by the memory color module 288 using the adjusted parameter. Based on user input, the change to the skin tone saturation may be accepted by the user or discarded. The process for evaluating changes to the skin tone region may be repeated for foliage, blue sky, and chroma suppression.

After evaluating the detected memory color regions, a check may be performed as to whether the image is over- or under-sharpened based on an adaptive spatial filtering algorithm. If the user elects to modify the sharpening, the memory 240 is searched for stored images having the same luma value and similar high-frequency components. A stored image may be displayed side-by-side with a modified version of the stored image that has been modified according to the proposed adjustment. The interface and photo editing module 262 may prompt the user with a message such as "This image was also sharpened the same amount due to similar characteristics. Are you still sure you want to change the camera's default setting? If this image is too 'noisy,' then we do not recommend changing this camera setting." The process may repeat for one or more additional image processing operations that may be adjusted.

If the user elects to make a change to any of the parameter values when the stored image count module 268 does not locate enough similar images to meet the count threshold 274, the user may be prevented from committing the change until a later time when enough pictures are available to demonstrate the effects of the change to the user. Alternatively, the user may be presented with a warning such as "Normally we would show you several other pictures that would be changed had they been taken with this new setting, but you have not taken enough pictures yet. We recommend you wait until there are more pictures in the database before making this change."

Figure 3:
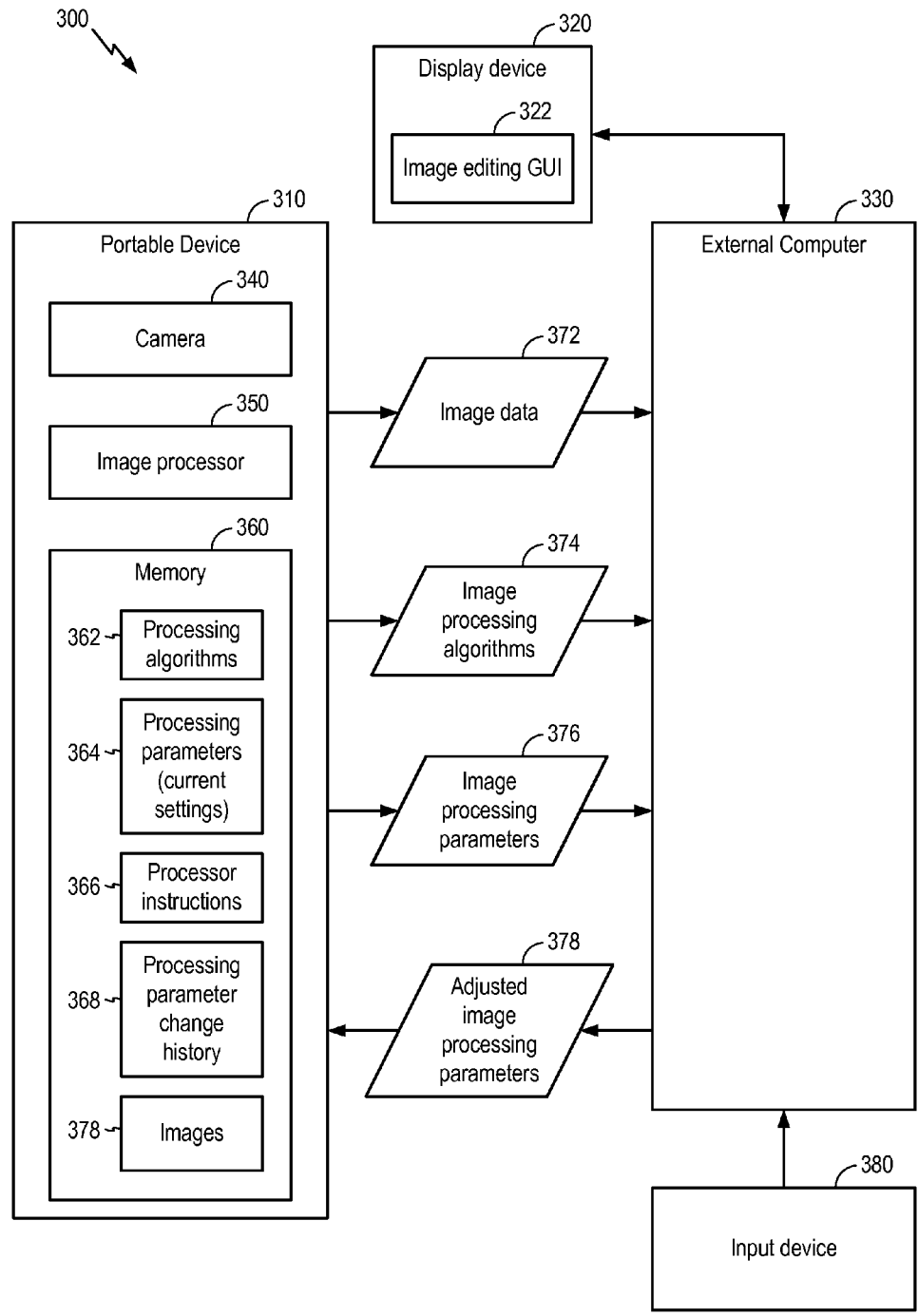
FIG. 3 is a block diagram of another particular illustrative embodiment of a system to capture and display images.

Referring to FIG. 3, a particular illustrative embodiment of a system to capture, process, and display images is disclosed and generally designated 300. The system 300 includes an apparatus such as a portable device 310 coupled to an external computer 330 that is coupled to a display device 320 and an input device 380. The portable device 310 includes a camera 340, an image processor 350, and a memory 360. In a particular embodiment, the system 300 enables tuning of image processing parameters, such as described with respect to FIGS. 1 and 2, to be performed at the external computer 330 and the resulting changes provided to the portable device 310. Tuning the image processing parameters at the external computer 330 may enable use of greater processing resources, a larger resolution display, and a more convenient user interface for a user than may be available at the portable electronic device 310.

In operation, the portable device 310 can provide image data 372 to the external computer 330. For example, the camera 340 can capture information associated with an image. The image processor 350 can process the information that has been captured by the camera 340, producing image data 372 that can be provided to the external computer 330. The memory 360 stores processing algorithms 362 such as algorithms used in the image processing pipeline 134 of FIG. 1 or the image processing module 264 of FIG. 2. The memory 360 also includes processing parameters 364, processor instructions 366, a processing parameter change history 368, and one or more stored images 370. The processing parameters 364 may be used in connection with the processing algorithms 362. In an illustrative embodiment, the processing parameters 364 may correspond to the default parameter values 276 of FIG. 2.

The portable device 310 may provide one or more image processing algorithms 374 to the external computer 330. For example, data and/or instructions representing one or more processing algorithms 362 stored in the memory 370 can be transferred to the external computer 330. Also available to be transferred to the external computer 330 are processor instructions 366. For instance, the processor instructions 366 can specify an order of image processing algorithms to be executed by the external computer 330.

The portable device 310 can provide to the external computer 330 image processing parameters 376, such as one or more of the processing parameters 364 stored in the memory 360. The processing parameters 376 may be used in connection with the image processing algorithms 374 that are provided to the external computer 330.

In a particular illustrative example, the portable device 310 provides the current value of a first image processing parameter to the external computer 330 and also provides an image processing algorithm 374 to the external computer 330. The external computer 330 may receive the current value of the image processing parameter and may execute the received image processing algorithm 374 via a photo editing application to produce an adjusted value of the image processing parameter based on user input. The adjusted value of the first image processing parameter can be transmitted back to the portable device 310 as one or more adjusted image processing parameters 378. Thus, the external computer 330 can execute processing algorithms to produce adjusted values of image processing parameters that can be transmitted back to the portable device 310 and stored as current settings of the processing parameters 364.

The portable device 310 may also maintain the change history 368. In a particular illustrative embodiment, the memory 360 stores a history of adjusted values of a first image processing parameter. The history of adjusted values of the first image processing parameter can be useful in determining whether the user has demonstrated consistency or indecision in the user's choice of the adjusted value of the first image processing parameter. If the user has shown indecision, the portable device 310 may revert to a default value of the first image processing parameter when additional images are requested by the user to be displayed. If the user has demonstrated consistency in the adjusted value of the first image processing parameter, the portable device 310 may replace the default value of the first image processing parameter with the adjusted value of the first image processing parameter.

The display device 320 is illustrated displaying an image editing graphical user interface (GUI) 322 that can enable a user of the external computer 330 to provide image modification data via the input device 330 that can be processed by the external computer 330 to arrive at an adjusted value of a corresponding image processing parameter. In a particular illustrative embodiment, the external computer 330 receives input, such as user generated image modification data associated with a particular image processing parameter, via the GUI 322. Additionally, the user may provide as input an affirmation that a displayed image that has been modified from a corresponding stored image according to the adjusted value of the particular image processing parameter is acceptable to the viewer in its modified form. The affirmation may be input via the GUI 322 or via the input device 380.

In operation, a user can capture an image as raw image data via the camera 340. The image processor 350 can process the raw image data to produce the image data 372 that can be downloaded to the external computer 330. Based on the image data 372, the external computer 330 can display an image at the display device 320. The user can provide image modification data associated with a first image processing parameter via the image editing GUI 322 to the external computer 330 in a manner similar to the described operation of the photo album application 132 of FIG. 1 or the interface and photo editing module 262 of FIG. 2. The external computer 330 can process the image modification data according to one or more of the image processing algorithms 374 and received from the portable device 310. The external computer 330 can generate an adjusted value of a first image processing parameter that was previously sent as one or more of the image processing parameters 376. The external computer 330 can process the image data 372 according to the adjusted value of the first image processing parameter to be displayed as a modified image at the display device 320. The user may verify the change to the to the image the display device 320 and the adjusted value of the first image processing parameter may be returned to the portable electronic device 310 as one or more of the adjusted image processing parameters 378.

In a particular illustrative example, the portable electronic device 310 can apply the adjusted value of the first image processing parameter to one or more of the plurality of stored images 370 to produce a corresponding plurality of adjusted images. One or more of the plurality of adjusted images can be sent to the external computer 330 to be displayed at the display device 320. The user can provide an affirmation, via the input device 380 or via the image editing GUI 322, that the adjusted value of the first image processing parameter is acceptable as applied to each of the modified images. In a particular illustrative example, after the user has provided corresponding affirmations for each of a predetermined threshold number of images, the first image processing parameter default value can be replaced by the adjusted value of the first image processing parameter value at the portable electronic device 310. In a similar fashion, after the user has provided affirmations for each of the predetermined threshold number of images displayed according to the adjusted value of a second image processing parameter, a default value the second image processing parameter may be replaced by a an adjusted value of the second image processing parameter.

Figure 4:
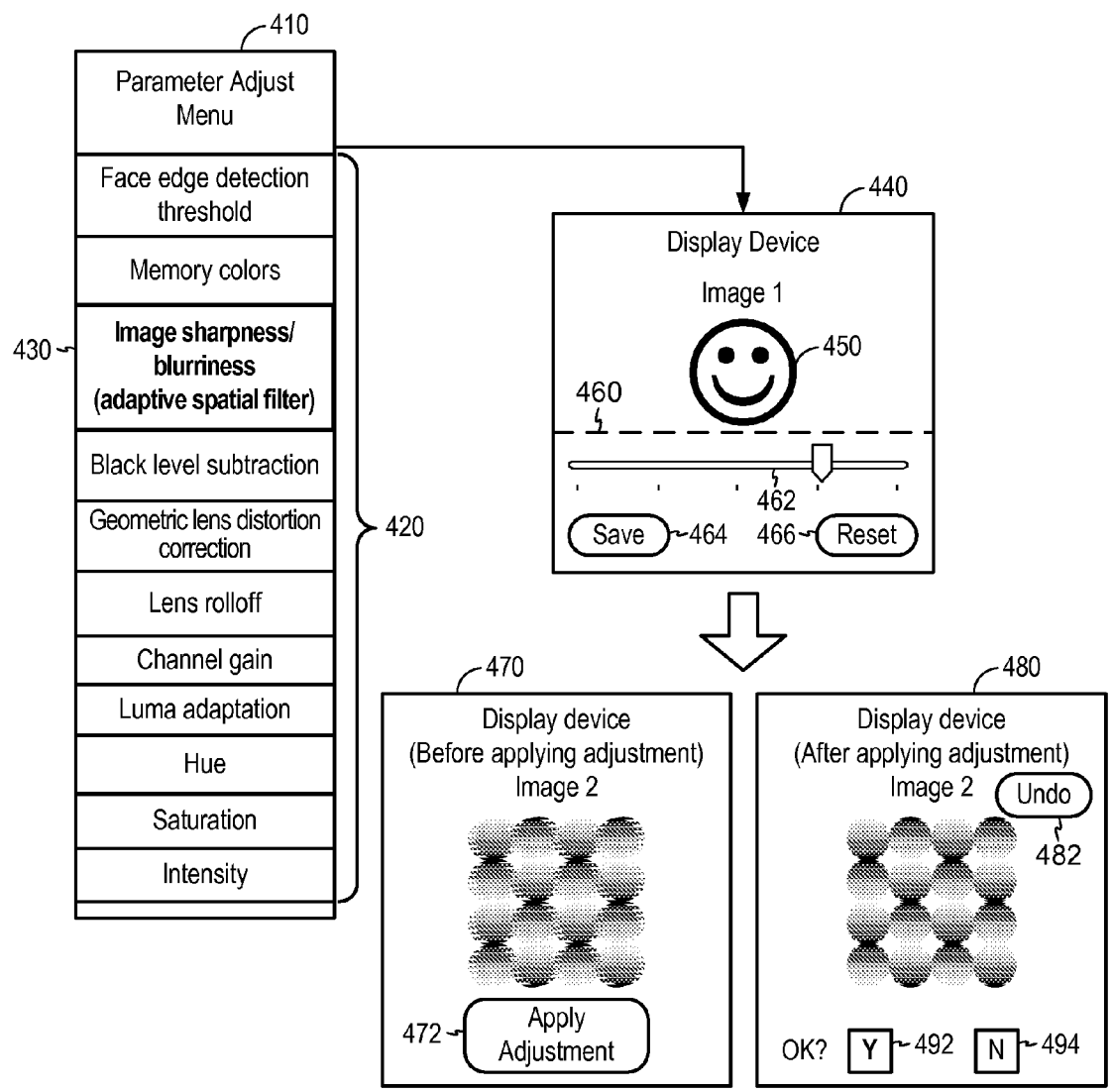
FIG. 4 is a block diagram of a particular illustrative embodiment of an apparatus to display images.

FIG. 4 is a block diagram of a particular illustrative embodiment of an apparatus to display images. The apparatus includes a parameter adjustment menu 410 that is coupled to a display device 440. The apparatus may be included in a portable device such as a phone, a personal digital assistant, or a digital camera. For example, the display device 440 may be implemented in the user interface 120 of FIG. 1 or the user interface 220 of FIG. 2.

The parameter adjustment menu 410 includes a plurality of selectable image processing parameters 420. The selectable image processing parameters include, but are not limited to, a face edge detection threshold, memory colors (such as one or more of blue sky saturation, green foliage saturation, skin tone enhancement, or white chroma suppress), image sharpness/blurriness (adaptive spatial filter), black level subtraction, geometric lens distortion correction, lens rolloff, channel gain, luma adaptation, hue, saturation, and intensity. The menu 410 can be displayed at the display device 440 or other display means, or may be implemented as one or more buttons or other physical selection devices. The display device 440 can display a first image 450 and a graphical user interface (GUI) 460. The GUI 460 can include an adjuster 462 such as a slider control, a save control 464, and a reset control 466.

In operation, a user can select one or more of the menu options representing image processing parameters within the parameter adjustment menu 410. For example, the user may select the image sharpness/blurriness (adaptive spatial filter) menu option 430. The user can adjust the adjuster 462 of the GUI 460, producing image modification data that is used to produce an adjusted value of the image sharpness/blurriness parameter. The adjusted value of the image sharpness/blurriness parameter can be applied to first image data corresponding to the first image 450 to produce a modified first image that can be displayed at the display device 440. When the user decides that the sharpness/blurriness parameter is adjusted according to user preference, the user can select the save control 464 to save the adjusted value of the sharpness/blurriness parameter. If the user is not satisfied with the modified image, the user can return the sharpness/blurriness parameter to a default value by selecting the reset control 466.

The adjusted value of the sharpness/blurriness parameter can be applied to a second image to produce a modified second image that is displayed. For example, a first screen 470 may display a second image before applying the adjusted value of the sharpness/blurriness parameter. The second image may have been captured by an image capture device of an apparatus and may be displayed at the first screen 470 according to a default value of the sharpness/blurriness parameter. The user can request that the adjusted value of the sharpness/blurriness parameter be applied to the second image by selecting an "apply adjustment" soft button 472.

A second screen 480 may display a modified second image that has been processed with the adjusted value of the sharpness/blurriness parameter that was determined from the user modifications to the first image. The user can select an "Undo" soft button 482 to revert to the default value of the sharpness/blurriness parameter, returning the display to the first screen 470. The user can affirm that the modified second image is acceptable by selecting a "yes" button 492 or reject the modified second image by selecting a "no" button 494.

In a similar fashion, the user can view a plurality of images and each image can be modified according to an adjusted value of a selected image processing parameter. In a particular illustrative embodiment, when a predetermined threshold number of images has been viewed and indicated as acceptable as modified by the adjusted value of the selected image processing parameter, a default value of the image processing parameter can be replaced by the adjusted image parameter value.

Figure 5:
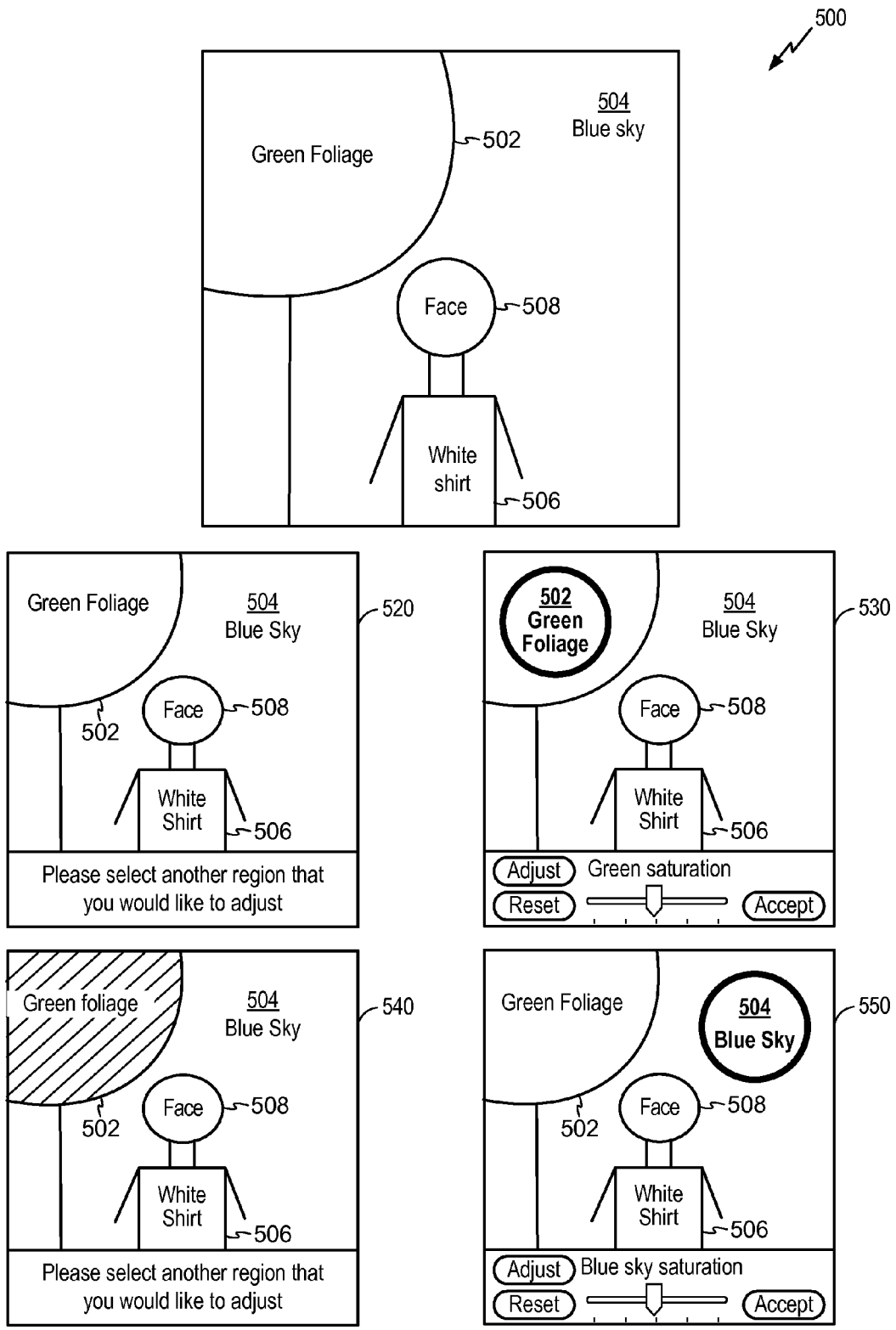
FIG. 5 is an illustration of a captured image to be modified according to a user selected value of an image processing parameter.

FIG. 5 is an illustration of a captured image 500 to be modified according to a user selected value of an image processing parameter. The image 500 includes a green foliage region 502, a blue sky region 504, a white region 506, and a face region 508. In a particular embodiment, a selected image processing parameter is associated with a memory color, and a corresponding adjusted value of the image processing parameter is associated with a saturation of the memory color. For example, one or more of the regions 502-508 may be identified via a memory color processing operation, such as may be performed by the memory color module 288 of FIG. 2.

In a particular illustrative embodiment, a user can select a first region of the image 500 at a first interactive screen 520 that is displayed and that prompts the user to select a first region of interest of the image 500 that the user would like to adjust. A second interactive screen 530 may be displayed after receiving an user input at the first interactive screen 520, such as a selection of the green foliage region 502. The second interactive screen 530 prompts the user to affirm a current value of a first image processing parameter as applied to the first region, or to input first image modification data. The first image processing parameter is associated with a first visual quality of the first region of interest, e.g., green color saturation.

In a particular illustrative embodiment, a third interactive screen 540 may be displayed, prompting the user to select a second region of interest of the first image 500 that the user would like to adjust. In a particular illustrative example, the first region 502 may be "grayed out" to indicate unavailability, and the user may select the blue sky region 504. A fourth interactive screen 550 can be displayed after displaying the third interactive screen 540, prompting the user to affirm a current value of a second image processing parameter or to provide second image modification data. The second image processing parameter is associated with a second visual quality e.g., blue sky saturation.

By selecting a first region to be modified according to a first image processing parameter, the user can observe modification of a region of the image that has a distinct color characteristic. For example, the user can select the green foliage region 502 to be modified according to a green memory saturation parameter. In a similar fashion the user can select the blue sky region 504 to be modified according to a blue sky saturation parameter. Similarly, the user can select the white region 506 to be modified according to a white chroma suppress image processing parameter. Further, the user can select the face region 508 to be modified according to a skin tone saturation parameter. Thus, the user can observe a modification in a particular image processing parameter as applied to a particular region of an image. In doing so, the user can make adjustments to each of a plurality of image processing parameters, each of which is adjusted according to its effect on a corresponding region of a displayed image.

Figure 6:
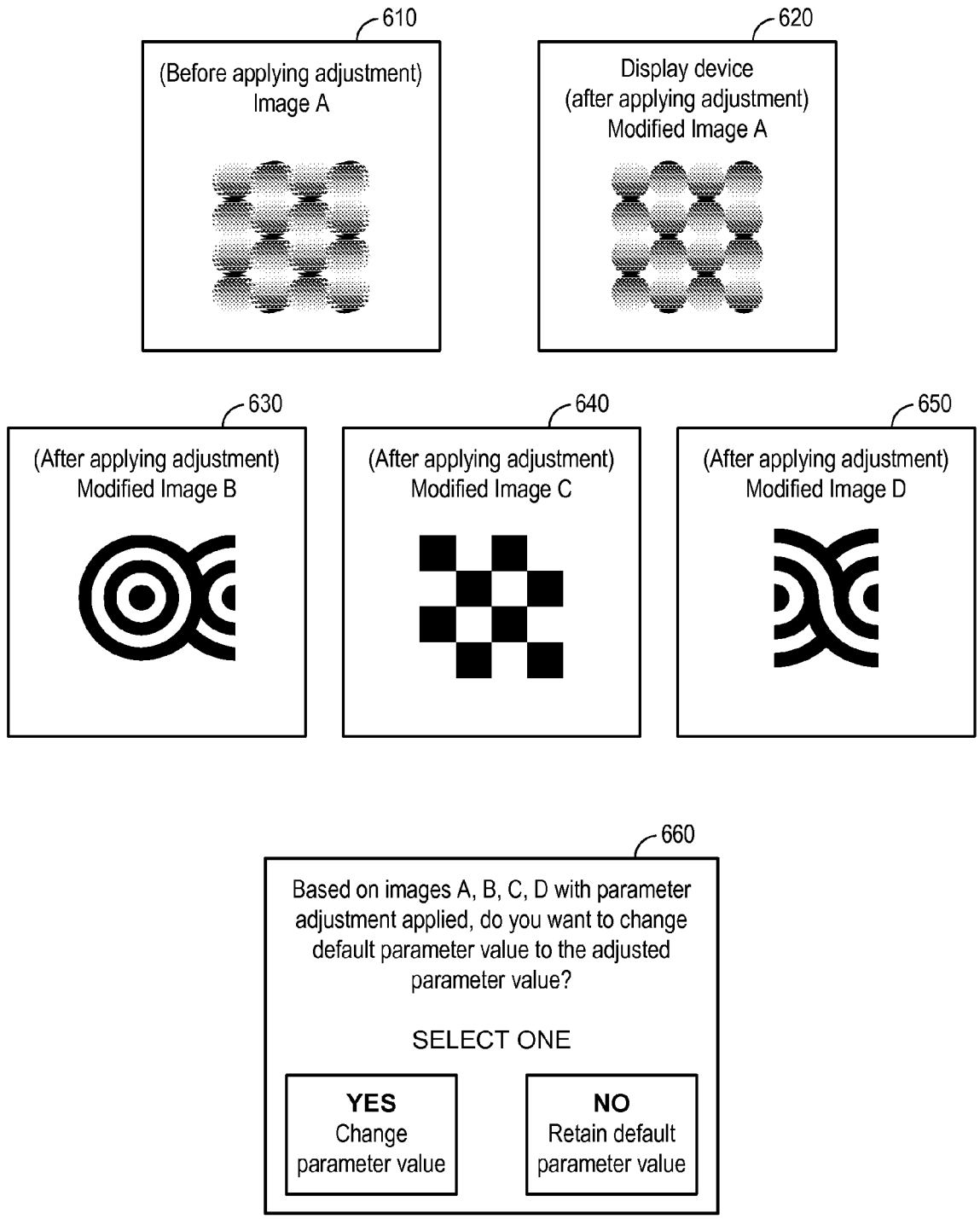
FIG. 6 is an illustration depicting training of an apparatus according to a user selected value of an image processing parameter.

FIG. 6 is an illustration depicting a series of screens that may be displayed to enable training of an image display apparatus according to a user selected value of an image processing parameter. Screen 610 displays an image "A." A user can modify image data associated with the image A to produce a modified image A, shown in screen 620. As illustrated, the user has provided sharpness/blurriness image modification data, such as via the user interface 120 of FIG. 1, and the modified image A shown in screen 620 is sharper than the image A shown in screen 610.

User input that is applied to generate the modified image data can be processed to produce an adjusted value of a corresponding image processing parameter, e.g., a sharpness/blurriness parameter. The adjusted value of the image processing parameter can be applied to a plurality of additional images. The additional images may be received from an image capture device, such as the image capture device 110 of FIG. 1, or may be retrieved from storage by executing a photo album application, such as the photo album application 132 of FIG. 1.

A series of screens may be displayed to the user to illustrate the effect of applying the change to image A to other images that have similar characteristics to image A, such as similar white balance and exposure values. For example, screen 630 shows an image B after the adjusted value of the image processing parameter has been applied. Similarly, screen 640 displays an image C after applying the adjusted value of the image processing parameter, and screen 650 displays an image D after the adjusted value of the image processing parameter has been applied. The number of images that are displayed may be determined according to a predetermined threshold number of images, such as four images, that are to be displayed to the user before committing the adjusted value of the image processing parameter.

A confirmation screen 660 may be displayed after the user has viewed screens 620, 630, 640, and 650. The confirmation screen 660 queries the user, based on having viewed images A, B, C and D with the adjusted value of the image processing parameter applied, whether the user wishes to change a default parameter value to the adjusted value of the image processing parameter. The user is prompted to select "yes" or "no". By selecting "yes" the default parameter value is changed to the adjusted image processing parameter. By selecting "no" the default image processing parameter value is retained.

Figure 7:
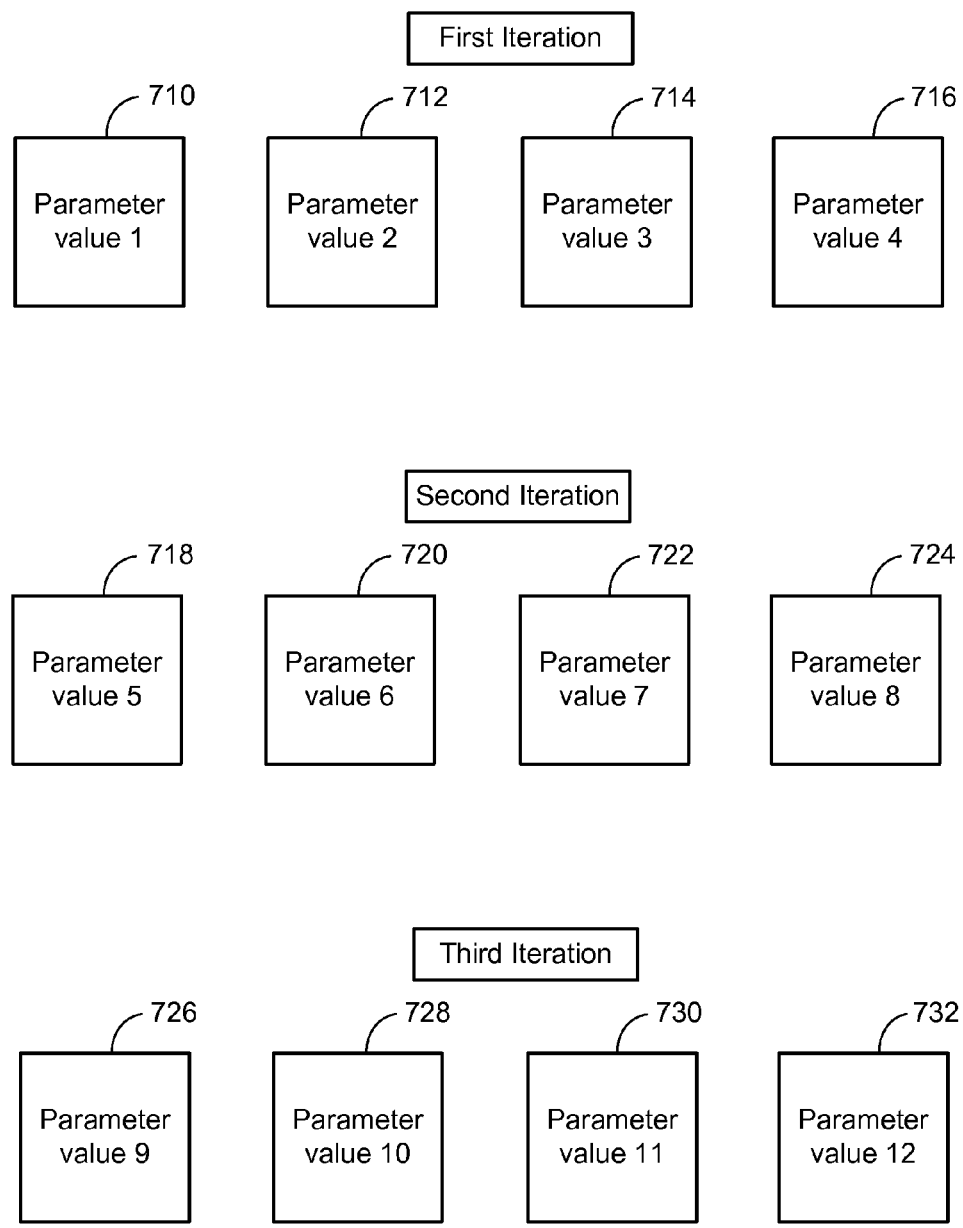
FIG. 7 is an illustration depicting a particular embodiment of training of an apparatus according to a user selected value of an image processing parameter.

FIG. 7 is an illustration depicting a particular embodiment of training of an apparatus according to a user selected value of an image processing parameter. In a first iteration, the user is presented with four versions of an image that has been processed according to each of four parameter values of a particular image processing parameter. For example, the user may access each of the four versions consecutively, such as viewing each of screens 710, 720, 730, and 740 consecutively. As an illustrative example, values of the image processing parameter in successive screens 710, 712, 714, and 716 may have corresponding values of 1.00, 2.00, 3.00, and 4.00, differing by an increment $\Delta_1=1.00$. The user may be asked to select a preferred version of the image from the choices at screens 710, 712, 714, and 716.

In a second successive iteration, the user may be presented with a second set of four screens 718, 720, 722, and 724, each having an image generated according to a corresponding associated parameter value of the particular image processing parameter within a portion of a numerical range of the first iteration. Each associated parameter value may differ from the associated parameter value of the subsequent screen by a fixed amount $\Delta_2$ that is smaller than $\Delta_1$. The user may be asked to select a preferred version of the image and associated parameter value from the screens 718, 720, 722, and 724. In a particular illustrative example, $\Delta_2=0.2$ and screens 718, 720, 722, and 724 have corresponding parameter values 2.60, 2.80, 3.00, and 3.20.

Optionally, the user can request a third successive iteration and make a visual comparison amongst a third set of screens 726, 728, 730, and 732, with corresponding parameter values within a portion of a numerical range of the second iteration. Each successive pair of screens of the third iteration may have a uniform difference of parameter values $\Delta_3$ that is smaller than $\Delta_2$. From the screens 726, 728, 730, and 732, the user may select a preferred image and its associated parameter value. Should the user indicate that there is no visually discernable difference among the displayed screens 726, 728, 730, and 732, selection of the parameter value can be based on the user selection made in the previous iteration. In a particular illustrative example, screens 726, 728, 730, and 732 have corresponding parameter values 3.10, 3.15, 3.20, and 3.25.

For example, in the first iteration the user selects screen 714, with the corresponding parameter value of 3.00. In the second iteration, the user selects screen 724, with the corresponding parameter value of 3.20. In the third iteration, the user is unable to discern a visual difference among the screens 726, 728, 730, and 732. Consequently, the selected screen 724 and its associated parameter value of 3.20 as the user selected adjusted value of the particular parameter. This iterative technique can be used in conjunction with a selectable portion of an image, as depicted in FIG. 5, to adjust a corresponding image parameter by limiting visual display to the selected portion.

Figure 8:
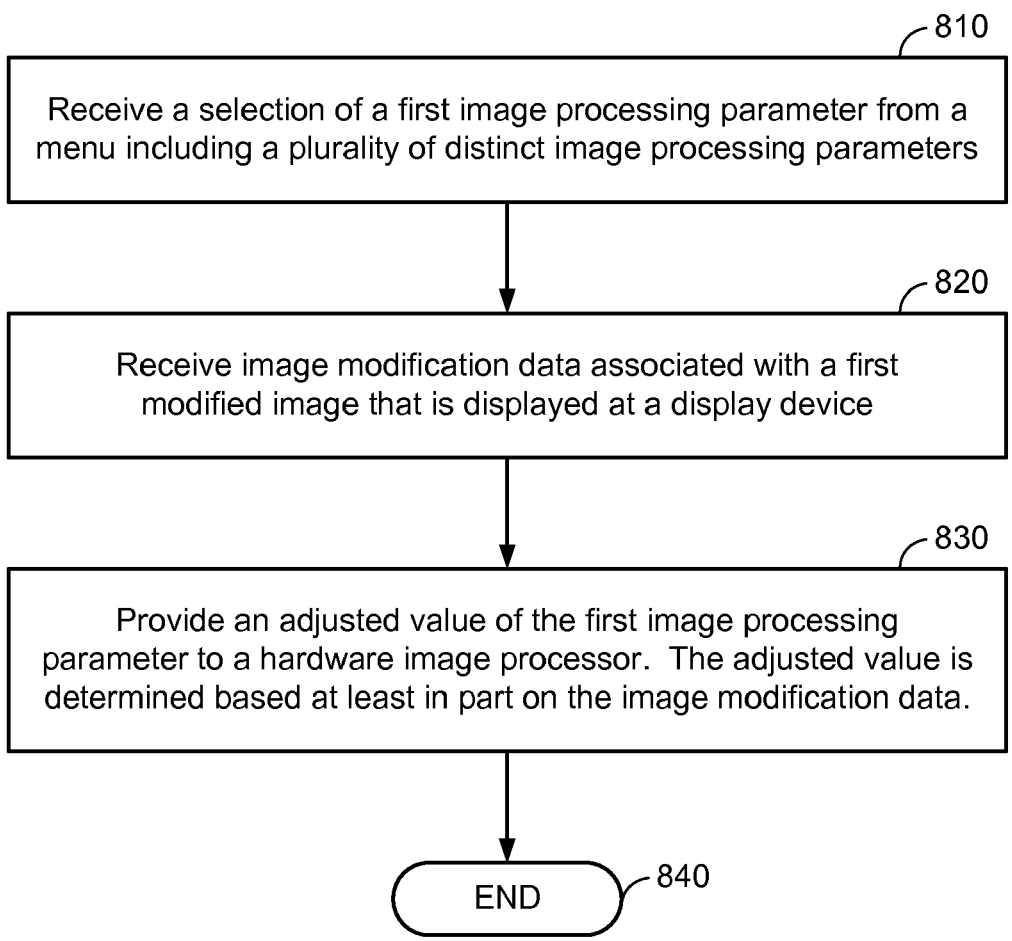
FIG. 8 is a flow chart of a particular illustrative embodiment of a method of training an apparatus according to a user selected value of an image processing parameter.

FIG. 8 is a flow chart of a particular illustrative embodiment of a method of training an image processing apparatus according to a user selected value of an image processing parameter. A selection of a first image processing parameter is received from a menu including a plurality of distinct image processing parameters, at 810. In an illustrative embodiment, the selection may be received via the menu 410 of FIG. 4, which may be displayed at the user interface 110 of FIG. 1 or the user interface 210 of FIG. 2.

Image modification data associated with a first modified image that is displayed at a display device is received, at 820. For example, the image modification data may be the image modification data 162 of FIG. 1 that is received at the central processing unit 130 and provided to the photo album application 132.

An adjusted value of the first image processing parameter is provided to a hardware image processor, at 830. For example, the adjusted value may be provided as the adjusted parameter value(s) 164 to be used by the image processing pipeline 134 of the central processing unit 130 of FIG. 1. The adjusted value is determined based at least in part on the image modification data. As another example, the adjusted value may be received at the image processor 234 in response to execution of the interface and photo editing module 262 at the general purpose processor 232 of FIG. 2. The adjusted value of the first image processing parameter can be used by the image processor 234 during execution of the image processing module 264 to be applied to a first image to produce a first modified image that is displayed at the user interface 220. The method terminates at 840.

Figure 9:
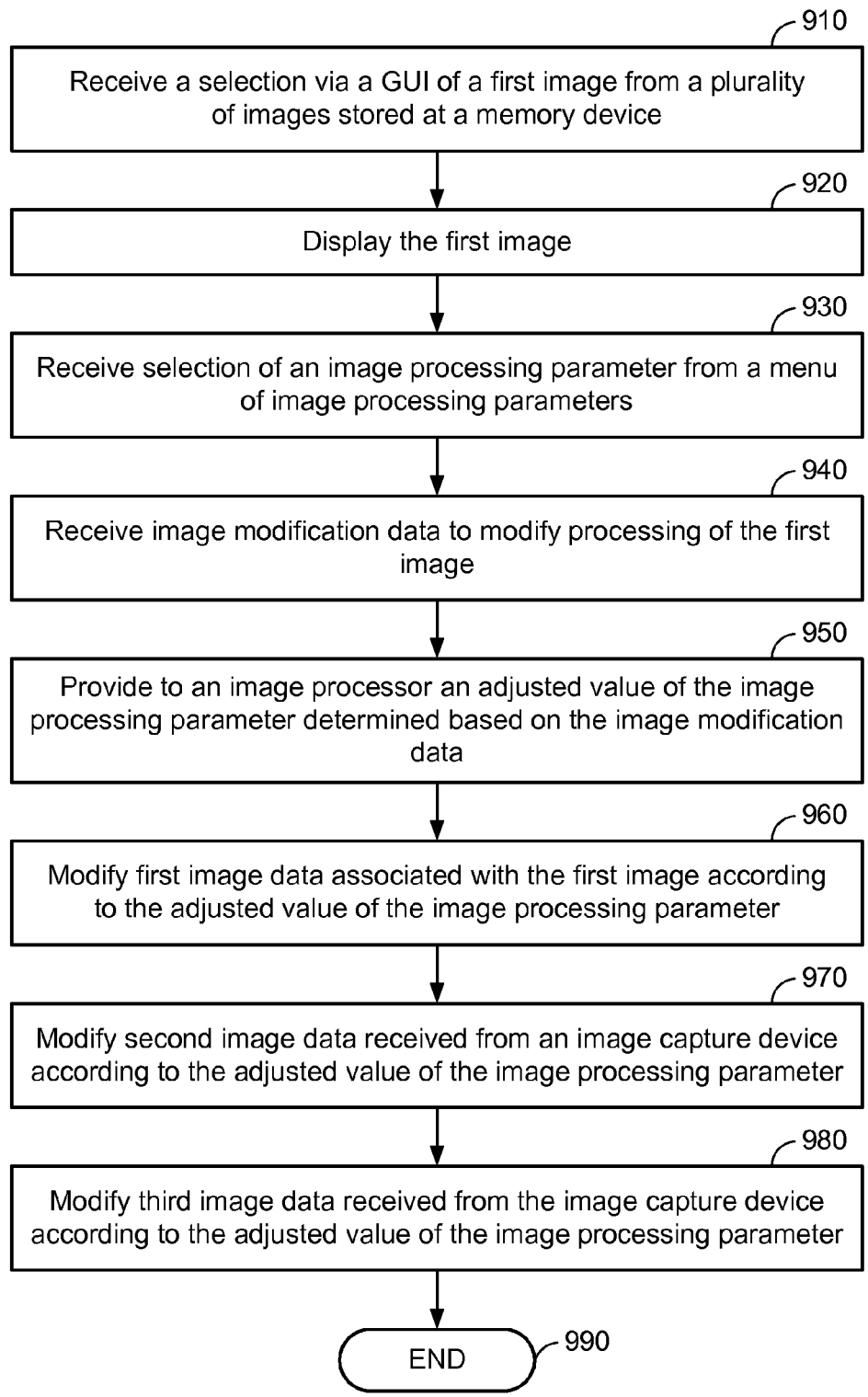
FIG. 9 is a flow chart of a particular illustrative embodiment of a method of modifying image data according to a user selected value of an image processing parameter.

FIG. 9 is a flow chart of a particular illustrative embodiment of a method of modifying image data according to a user selected value of an image processing parameter. A selection is received via a graphical user interface (GUI) of a first image from a plurality of images stored at a memory device, at 910. In a particular illustrative embodiment, the selection is received via a photo album application at a portable electronic device, such as the photo album application 132 of FIG. 1. An image processor, an image capture device coupled to the image processor, and a display device may be integrated in a portable electronic device.

The first image is displayed, at 920. In a particular illustrative embodiment, the first image is displayed according to a default value of the image processing parameter. A selection of an image processing parameter is received from a menu that includes a plurality of image processing parameters, at 930, such as the menu 410 of FIG. 4. Image modification data to modify processing of the first image is received, at 940. In a particular illustrative embodiment, the image modification data is generated in response to a graphical user interface (GUI), such as via the GUI elements 126 provided at the user interface 110 of FIG. 1. An adjusted value of the image processing parameter is provided to an image processor and is determined based on the image modification data, at 950. As an example, the adjusted value may be provided as the adjusted parameter value(s) 164 of FIG. 1.

First image data associated with the first image is modified according to the adjusted value of the image processing parameter to provide a first adjusted image, at 960. Second image data received from an image capture device and associated with a second image is modified according to the adjusted value of the image processing parameter, at 970. Third image data received from the image capture device and associated with a third image is modified according to the adjusted value of the image processing parameter, at 980. For example, the first, second, and third modified sets of image data may be used to generate the screens 630-650 of FIG. 6 prior to confirming the effect of applying the adjusted value at the confirmation screen 660. The method terminates at 990.

Figure 10:
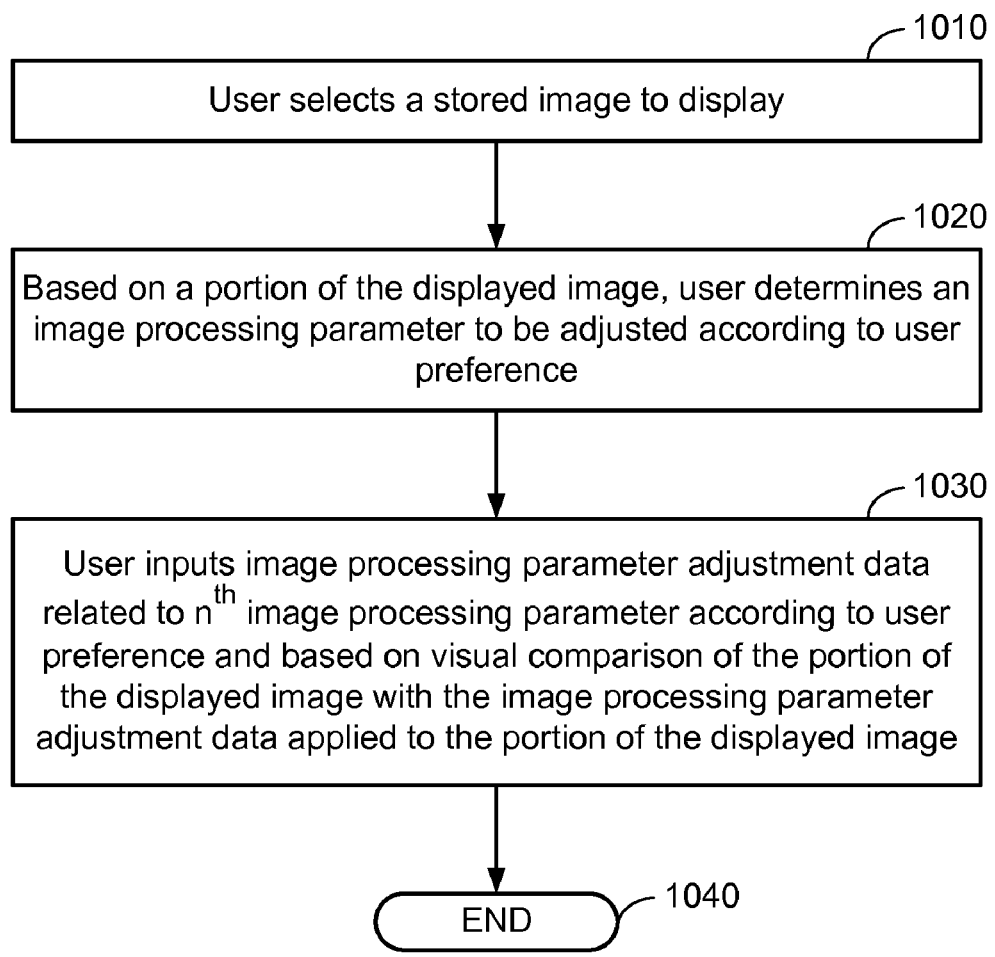
FIG. 10 is a flow chart of a particular illustrative embodiment of a method of training an apparatus according to user selected values of a plurality of image processing parameters.

FIG. 10 is a flow chart of a particular illustrative embodiment of a method of training an image processing apparatus according to user selected values of a plurality of image processing parameters. In an illustrative embodiment, the method may be performed at one or more of the systems of FIGS. 1-3.

A user selects a stored image to display, at 1010. Based on a portion of a displayed image, the user determines an image processing parameter to be adjusted according to a user preference, at 1020. The user inputs image processing parameter adjustment data related to a particular image processing parameter (e.g., the $n^{th}$ parameter of a total of N image processing parameters) according to user preference and based on a visual comparison of the portion of the displayed image with image processing parameter adjustment data applied to the portion of the displayed image, at 1030. The method terminates at 1040.

As an illustrative example of operation with reference to FIG. 5, a user can select green foliage memory color saturation to be the particular image processing parameter at the screen 520 by selecting the green foliage region 502 of the displayed image 500. The user can provide image modification data by adjusting one or more controls at the screen 530. The green foliage region 502 at screen 530 that has been modified according to the adjusted value of green foliage memory color saturation can be compared with the unmodified green foliage region 502 that is displayed at screen 520 according to a default value of green foliage memory color saturation.

Figure 11:
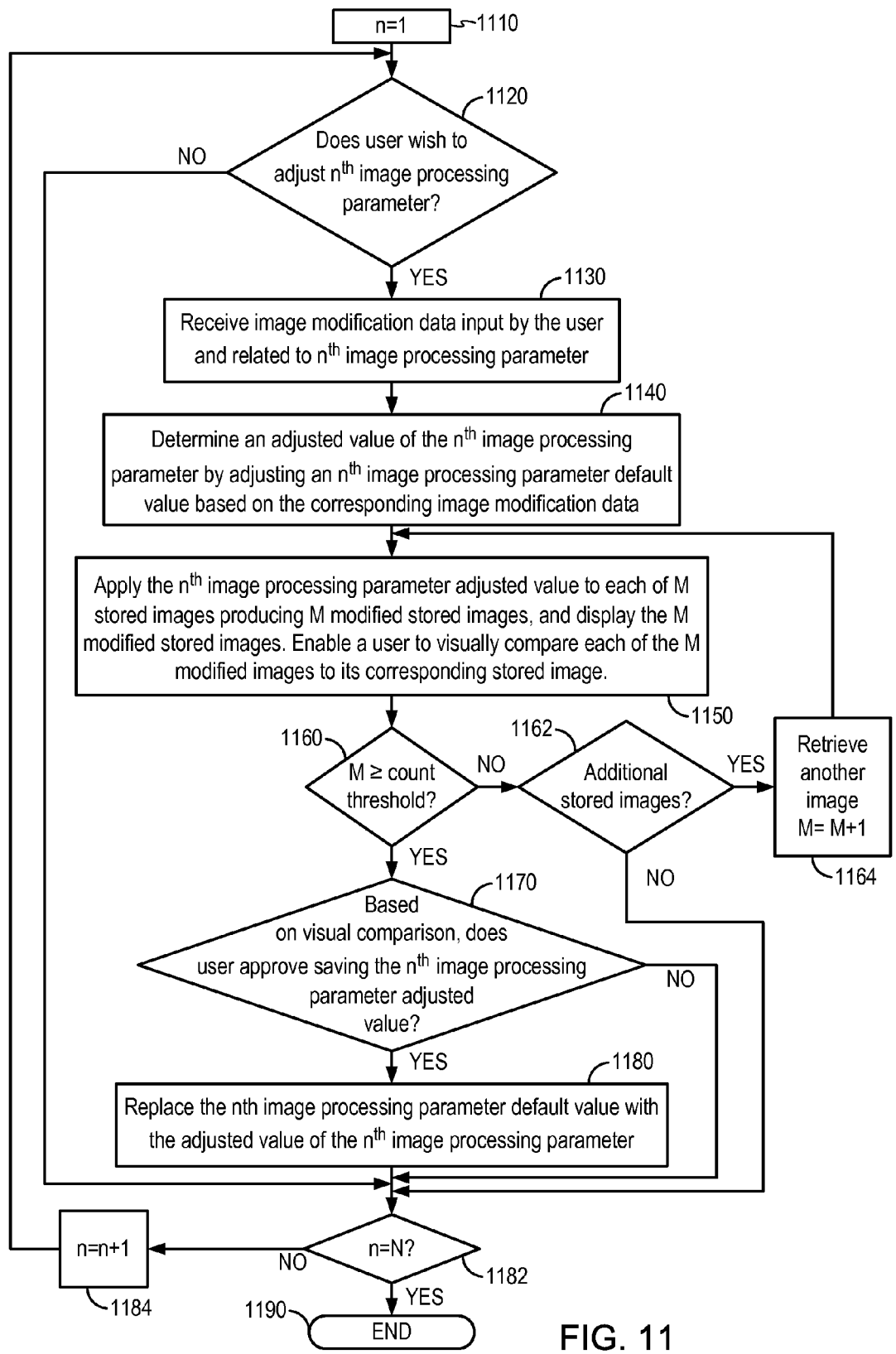
FIG. 11 is a flow chart of a particular illustrative embodiment of a method of training an apparatus according to user selected values of one or more image processing parameters.

FIG. 11 is a flow chart of a particular illustrative embodiment of a method of training an image processing apparatus according to user selected values of one or more image processing parameters. As an example, the method may correspond to operations described with respect to the system 200 of FIG. 2 to walk a user through available image adjustment options to tune image processing at the system 200.

The method begins with setting an index number n equal to 1, at 1110. The user is asked if the user elects to adjust an n image processing parameter, where n is an integer index having a value between 1 and N, at 1120. If the answer is "no," the method proceeds to 1182, and a determination is made whether n is equal to a total number of image processing parameters (N). If n is equal to N, the method ends at 1190. If n is not equal to N, the index n is increased by 1, at 1184, and the method returns to 1120.

At 1120, if the user wishes to adjust the $n^{th}$ image processing parameter, the method proceeds to 1130, and image modification data input by the user and related to the $n^{th}$ image processing parameter is received. Advancing to 1140, an adjusted value of the $n^{th}$ image processing parameter is determined by adjusting the $n^{th}$ image processing parameter default value based on the corresponding image modification data.

Proceeding to 1150, the adjusted value associated with the $n^{th}$ image processing parameter is applied to each of M stored images, producing M modified images. For example, the M stored images may include images identified by the stored image count module 268 of FIG. 2 to have similar characteristics as the current image. In a particular embodiment, the M modified images are displayed and the user is enabled to visually compare each of the M displayed images to its corresponding stored image, at 1150. In a particular illustrative embodiment, each modified image is modified by all parameter adjustments that have been applied and the modified image has been processed according to a predetermined image processing order. For example, the predetermined image processing order can be the order of parameter processing of an image processing pipeline associated with a processor.

The number M is compared to a predetermined count threshold, at 1160. If M is not greater than or equal to the count threshold, a determination is made whether there are additional stored images to be used to illustrate an effect of changing the default parameter value to the adjusted value. If another stored image is available, the stored image is retrieved at 1164 and M is increased to M+1. If there are no other applicable stored images available, the method proceeds to 1182.

At 1160, if M is greater than or equal to the count threshold, the method proceeds to 1170 and a determination is made whether, based on visual comparison of each of the M displayed images to the corresponding stored image, the user approves saving the adjusted value of the $n^{th}$ image processing parameter. If the user approves, the $n^{th}$ image processing parameter default value is replaced by the adjusted value of the $n^{th}$ image processing parameter, at 1180, and the method proceeds to 1182. When the user does not approve saving the $n^{th}$ image processing parameter adjusted value, the method proceeds to 1182, to terminate at 1190 when n is equal to N, or to increment the value of n at 1184 and to return to 1120.

The method shown in FIG. 11 can enable a user to apply an adjusted value of a particular image processing parameter to a plurality of stored images in order to decide if the adjusted value of the particular image processing parameter produces more acceptable images to the user than the image processing parameter default value and if so, the image processing parameter default value can be replaced by the adjusted value of the image processing parameter. By applying the adjusted value of the image processing parameter to a plurality of images and evaluating the modified images, the user can be convinced of a decision to change the default value of the image processing parameter to the adjusted value.

Figure 12:
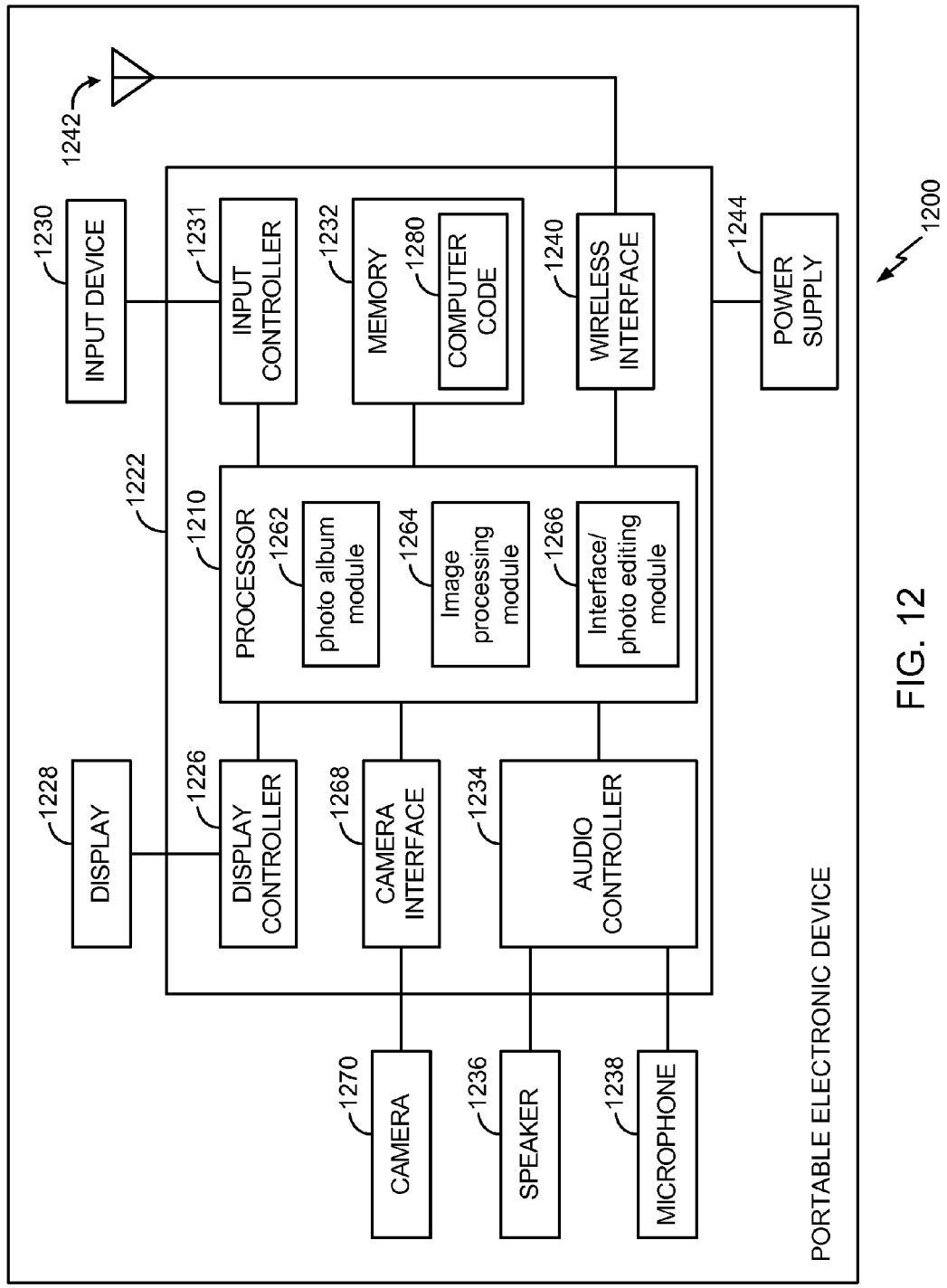
FIG. 12 is a block diagram of portable device including an apparatus to capture and display images.

Referring to FIG. 12, a block diagram of a particular illustrative embodiment of an electronic device 1200 including an image processing module 1264, a photo album module 1262, and an interface/photo editing module 1266 that can tune the image processing module 1264 is depicted. The device 1200 includes a processor 1210, such as a general purpose processor, an image processor, a digital signal processor, or any combination thereof, coupled to a memory 1232 storing code 1280 that may be executable to implement one or more of the modules 1262-1266. The processor 1210 is also coupled to a camera interface 1268, an audio controller 1234, and a display controller 1226. The display controller 1226 is coupled to a display 1228. A speaker 1236 and a microphone 1238 can be coupled to the audio controller 1234. In an illustrative example, the electronic device 1200 includes one or more of the system 100 of FIG. 1, the system 200 of FIG. 2, and the portable device 310 of FIG. 3, and the electronic device 1200 operates in accordance with any of FIGS. 4-11, or any combination thereof, by modifying stored images or images received from the camera 1270.

FIG. 12 also indicates that a wireless interface 1240 can be coupled to the processor 1210 and to a wireless antenna 1242. In a particular embodiment, the processor 1210, the display controller 1226, the camera interface 1268, the audio controller 1234, the memory 1232, the input controller 1231, and a wireless interface 1240 are included in a system-in-package or system-on-chip device 1222. In a particular embodiment, a power supply 1244, a camera 1270, a speaker 1236, and a microphone 1238 are coupled to the system-on-chip device 1222. Moreover, in a particular embodiment, as illustrated in FIG. 12, the display 1228, the input device 1230, the speaker 1236, the microphone 1238, the wireless antenna 1242, and the power supply 1244 are external to the system-on-chip device 1222. However, each of the display 1228, the input device 1230, the speaker 1236, the microphone 1238, the wireless antenna 1242, the camera 1270, and the power supply 1244 can be coupled to a component of the system-on-chip device 1222, such as to an interface or to a controller.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of tangible storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    receiving, with one or more processors, a selection via a graphical user interface (GUI) of an image selected from a plurality of images stored at a memory;
    retrieving, with the one or more processors, the image from the memory;
    displaying, with the one or more processors, the image at a display device;
    receiving, with the one or more processors, image modification data to modify processing of the image;
    providing, with the one or more processors, to an image processor an adjusted value of an image processing parameter, wherein the adjusted value of the image processing parameter is determined based at least in part on the image modification data;
    determining, with the one or more processors, whether a count of images within a subset of the plurality of images satisfies a predetermined count threshold, wherein each image of the subset has an associated image characteristic and a corresponding image characteristic value that is substantially equal to an image characteristic value associated with the image; and
    preventing, with the one or more processors, the adjusted value of the image processing parameter from being provided to the image processor when the count does not satisfy the predetermined count threshold.

2. The method of claim 1, further comprising receiving a selection of the image processing parameter via the GUI from a menu that includes a plurality of distinct image processing parameters.

3. The method of claim 1, further comprising modifying image data associated with the first image according to the adjusted value of the image processing parameter to provide a first modified image.

4. The method of claim 1, wherein the image modification data is generated in response to an input entered via the GUI.

5. The method of claim 1, wherein the image is displayed according to a default value of the image processing parameter.

6. The method of claim 1, wherein the image processor, an image capture device coupled to the image processor, and the display device are integrated in a portable electronic device.

7. The method of claim 6, wherein the selection is received via a photo album application at the portable electronic device.

8. The method of claim 6, wherein the image is a first image, the method further comprising:

modifying image data associated with a second image according to the adjusted value of the image processing parameter, wherein the image data is received from the image capture device.

9. The method of claim 8, further comprising modifying image data associated with a third image according to the adjusted value of the image processing parameter after the third image is captured by the image capture device.

10. A non-transitory computer readable medium storing processor-executable instructions that, when executed by a processor, cause the processor to:
receive a selection via a graphical user interface (GUI) of an image selected from a plurality of images stored at a memory device;
retrieve the image from the memory device;
display the image at a display device;
receive image modification data to modify processing of the image;
provide an adjusted value of an image processing parameter to an image processor, wherein the adjusted value of the image processing parameter is determined based at least in part on the image modification data;
determine whether a count of images within a subset of the plurality of images satisfies a predetermined count threshold, wherein each image of the subset has an associated image characteristic and a corresponding image characteristic value that is substantially equal to an image characteristic value associated with the image; and
prevent the adjusted value of the image processing parameter from being provided to the image processor when the count does not satisfy the predetermined count threshold.

11. The computer readable medium of claim 10, wherein the image processing parameter is one of black level subtraction, geometric lens distortion correction, lens rolloff, channel gain, luma adaption, hue, saturation, and intensity.

12. The computer readable medium of claim 10, wherein the adjusted value of the image processing parameter is associated with a saturation of a memory color.

13. The computer readable medium of claim 12, wherein the memory color is associated with a skin region of the image, a blue sky region of the image, or a green foliage region of the image.

14. The computer readable medium of claim 10, wherein the image processing parameter is associated with an image sharpness.

15. The computer readable medium of claim 10, wherein the first image is displayed according to a default value of the image processing parameter.

16. The non-transitory computer readable medium of claim 10, wherein the image is a first image, and wherein the non-transitory computer readable medium further comprises processor-executable instructions that, when executed by the processor, cause the processor to modify a second image from the plurality of images stored at the memory device, wherein the second image is modified according to the adjusted value of the image processing parameter.

17. A portable electronic device comprising:
means for storing a plurality of images;
means for receiving a selection via a graphical user interface (GUI) of an image selected from the plurality of images stored in the means for storing the plurality of images;
means for retrieving the image from the means for storing the plurality of images;
means for displaying the image;
means for receiving image modification data to modify processing of the image;
means for providing to an image processor an adjusted value of an image processing parameter, wherein the adjusted value of the image processing parameter is based at least in part on the image modification data;
means for determining whether a count of images within a subset of the plurality of images satisfies a predetermined count threshold, wherein each image of the subset has an associated image characteristic and a corresponding image characteristic value that is substantially equal to a image characteristic value associated with the image; and
means for preventing the adjusted value of the image processing parameter from being provided to the image processor when the count does not satisfy the predetermined count threshold.

18. The portable electronic device of claim 17, wherein the means for displaying includes means for displaying an adjustable control to adjust a parameter selected from black level subtraction, geometric lens distortion correction, lens roll-off, channel gain, luma adaption, hue, saturation, and intensity, and wherein the adjustable control provides the image modification data associated with adjustment of the selected parameter via the GUI.

19. The portable electronic device of claim 17, wherein the means for displaying further comprises:
means for displaying a first interactive screen to prompt a user to select a region of interest of the image; and
means for displaying a second interactive screen after displaying the first interactive screen, the second interactive screen to prompt the user to affirm a value of the image processing parameter or to input the image modification data, wherein the image processing parameter is associated with a visual quality of the region of interest.

20. The portable electronic device of claim 19, wherein the image modification data is first image modification data, the image processing parameter is a first image processing parameter, the region of interest is a first region of interest, and the visual quality is a first visual quality, and wherein the device further comprises:
means for displaying a third interactive screen to prompt the user to select a second region of interest of the image; and
means for displaying a fourth interactive screen after displaying the third interactive screen, the fourth interactive screen to prompt a user to affirm a value of a second image processing parameter or to provide second image modification data, wherein the second image processing parameter is associated with a second visual quality of the second region of interest.

21. The portable electronic device of claim 17, wherein the image modification data is first image modification data, the adjusted value is a first adjusted value, and wherein the means for receiving the image modification data comprises:
means for receiving the first image modification data to modify processing of the image prior to displaying a first modified image that is based on the first image;
means for receiving second image modification data after receiving the first image modification data, the second image modification data to modify processing of the image prior to displaying a second modified image that is based on the image; and
means for providing to an image processor a second adjusted value of the image processing parameter that is based at least in part on the second image modification data.

22. The portable electronic device of claim 21, wherein the means for receiving the image modification data further comprises:
  means for receiving third image modification data after receiving the second image modification data, the third image modification data to modify processing of the image prior to displaying a third modified image that is based on the image; and
  means for providing to the image processor a third adjusted value of the image processing parameter that is based at least in part on the third image modification data.

23. The portable electronic device of claim 22, further comprising comparison means for:
  comparing the first adjusted value of the image processing parameter with the second adjusted value of the image processing parameter;
  comparing the first adjusted value of the image processing parameter with the third adjusted value of the image processing parameter; and
  providing a warning in response to determining that the first adjusted value of the image processing parameter is substantially equal to the second adjusted value of the image processing parameter, or that the first adjusted value of the image processing parameter is substantially equal to the third adjusted value of the image processing parameter.

24. The portable electronic device of claim 21, wherein the means for receiving the image modification data further comprises means for sending the first adjusted value of the image processing parameter and the second adjusted value of the image processing parameter to a service provider.

25. The apparatus of claim 17, wherein the image is a first image, and wherein the apparatus further comprises:
  means for displaying a modified image that is based on a second image that has been captured by an image capture device and that is modified according to the adjusted value of the image processing parameter.

26. An apparatus, comprising:
  a processor; and
  a memory accessible to the processor, wherein the memory includes:
    a photo album module executable by the processor to receive a selection via a graphical user interface (GUI) of an image selected from a plurality of images stored at the memory and to retrieve the image from the memory;
    an interface module executable by the processor to display the first image at a display device;
    an image processing module executable by the processor to receive image modification data to modify processing of the image and to provide to the processor an adjusted value of an image processing parameter, wherein the adjusted value of the image processing parameter is based at least in part on the image modification data;
    a stored image count module executable by the processor to determine whether a count of images within a subset of the plurality of images satisfies a predetermined count threshold, wherein each image of the subset has an associated image characteristic and a corresponding image characteristic value that is substantially equal to an image characteristic value associated with the image; and
    a parameter adjustment module executable by the processor to prevent the adjusted value of the image processing parameter from being provided to the image processor when the count does not satisfy the predetermined count threshold.

27. The apparatus of claim 26, further comprising:
  a camera,
  wherein the memory further includes a camera interface module executable by the processor to capture the plurality of images and store the plurality of images on the memory, and
  wherein the image processing module is executable by the processor to modify processing of images subsequently captured by the camera based on the adjusted value.

28. The portable electronic device apparatus of claim 26, wherein the adjusted value of the image processing parameter is a threshold value that indicates an amount of image blurriness acceptable to a user.

29. The portable electronic device apparatus of claim 26, wherein the image is stored as a joint photographic experts group (jpeg) file, and wherein the image is selected based on at least one data value of an exchangeable image file format (EXIF) tag of the jpeg file substantially matching a corresponding value of the image.

30. The apparatus of claim 26, wherein the interface module provides the adjusted value of the image processing parameter to the processor in response to receipt of an affirmative response to a verification prompt that is displayed at the display device.

31. The apparatus of claim 30, wherein the image is a first image, and wherein the affirmative response to the verification prompt is associated with a modified image that is based on a second image which is processed according to the adjusted value of the image processing parameter, wherein the modified image is indicated as acceptable to a viewer of the display device.

32. The device apparatus of claim 26, wherein the image is displayed at the display device according to a default value of the image processing parameter.

33. The apparatus of claim 26, further comprising an image capture device coupled to the processor and to the display device, wherein the image capture device is integrated with the processor in a portable electronic device.

* * * * *